(12) United States Patent
Lavergne et al.

(10) Patent No.: US 7,702,429 B2
(45) Date of Patent: Apr. 20, 2010

(54) ELECTRIC FLIGHT CONTROL SYSTEM FOR AIRCRAFT ELEVATORS

(75) Inventors: Fabien Lavergne, Toulouse (FR); Fabrice Villaume, Toulouse (FR)

(73) Assignee: Airbus France, Toulouse (FR)

( * ) Notice: Subject to any disclaimer, the term of this patent is extended or adjusted under 35 U.S.C. 154(b) by 607 days.

(21) Appl. No.: 11/573,524

(22) PCT Filed: Jul. 27, 2005

(86) PCT No.: PCT/FR2005/001950

§ 371 (c)(1),
(2), (4) Date: Feb. 9, 2007

(87) PCT Pub. No.: WO2006/024745

PCT Pub. Date: Mar. 9, 2006

(65) Prior Publication Data

US 2007/0246605 A1    Oct. 25, 2007

(30) Foreign Application Priority Data

Aug. 13, 2004   (FR) .................................. 04 08862

(51) Int. Cl.
    *G05D 1/06* (2006.01)
(52) U.S. Cl. .............................. 701/6; 701/4; 244/76 R; 244/178; 244/181; 244/228; 318/584
(58) Field of Classification Search ............... 701/4, 701/5, 6; 244/18.1, 76 R, 99.2, 178, 179, 244/180, 181, 228, 8.1; 318/584
See application file for complete search history.

(56) References Cited

U.S. PATENT DOCUMENTS

| 4,373,184 A |   | 2/1983  | Lambregts |         |
|-------------|---|---------|-----------|---------|
| 4,580,210 A |   | 4/1986  | Nordstrom |         |
| 5,016,177 A |   | 5/1991  | Lambregts |         |
| 5,127,608 A |   | 7/1992  | Farineau et al. |   |
| 5,186,416 A |   | 2/1993  | Fabre et al. |      |
| 5,365,446 A |   | 11/1994 | Farineau et al. |   |
| 5,527,002 A | * | 6/1996  | Bilange et al. | ............. 244/181 |

FOREIGN PATENT DOCUMENTS

| EP | 0867362 | 9/1998 |
| FR | 2656585 | 7/1991 |
| FR | 2664231 | 1/1992 |
| FR | 2668750 | 5/1992 |

OTHER PUBLICATIONS

International Search Report dated Dec. 5, 2005.

* cited by examiner

*Primary Examiner*—Thomas G Black
*Assistant Examiner*—Peter D Nolan
(74) *Attorney, Agent, or Firm*—Dickinson Wright PLLC

(57) ABSTRACT

The invention relates to an electric flight control system for aircraft elevators. According to the invention, the flight control system can be controlled in terms of load factor or rate of pitch. The inventive system comprises built-in protections in relation to load factor, incidence and pitch attitude.

10 Claims, 3 Drawing Sheets

US 7,702,429 B2

ELECTRIC FLIGHT CONTROL SYSTEM FOR AIRCRAFT ELEVATORS

FIELD OF THE INVENTION

The present invention relates to an electric flight control system for the control of the elevators of an aircraft.

BACKGROUND OF RELATED ART

It is known that, in airplanes with mechanical controls, the stick directly controls an angle of deflection of the elevators, the amplitude of this angle being proportional to the swing of said stick. Thus, by acting on said stick, the pilot exerts a piloting action which momentarily positions the airplane about its center of gravity or which controls the attitude of said airplane. Such a piloting action is instinctive for the pilot.

It is also known that the electric flight controls, with which numerous modern airplanes are now equipped, make it possible to control an airplane by objective, that is to say to directly control a parameter, such as the load factor, by way of said stick, everything occurring as if the latter were graduated in terms of load factor. Such control is advantageous since, by graduating the stick in terms of load factor and by limiting the extent of controllable load factor, one is sure to preserve the integrity of the airplane in any maneuver whatsoever.

On the other hand, control in terms of load factor is not very instinctive for the pilot, since control in terms of load factor makes it possible to guide the airplane in the long term rather than to pilot it at an instant. Specifically, commanding a zero load factor amounts to prescribing a constant aerodynamic slope. By virtue of the stick, it is thus possible to guide the airplane by controlling its trajectory, thereby making it possible to easily use said electric flight controls either with a human pilot, or with an automatic pilot.

However, it results from the foregoing that, in very dynamic flight phases, for example in proximity to the ground, during which the control tasks are very short term, one is compelled to substitute with, for example said control in terms of load factor control in terms of rate of pitch.

Additionally, the known electric controls in terms of load factor cannot integrate protection of the airplane in terms of longitudinal attitude. It is therefore necessary to append thereto a supplementary attitude-based protection law and to interface the latter accurately with the electric flight control in terms of load factor, so as to avoid problems in proximity to the ground, such as touchdown of the tail (or tail-strike).

Moreover, it is also impossible to protect the airplane in terms of incidence solely through electric controls in terms of load factor. It is therefore necessary, here again, to add a supplementary incidence-based protection law and to undertake deft interfacing to avoid the risks of stalling of the airplane during standard maneuvers.

SUMMARY OF THE IVVENTION

The object of the present invention is to remedy these drawbacks and it relates to electric flight controls making it possible to control the aircraft in terms of load factor in certain flight conditions and in terms of rate of pitch in others and integrating protections in terms of load factor, incidence and longitudinal attitude.

For this purpose, according to the invention, the electric flight control system for the control in terms of load factor of the elevators of an aircraft, said elevators being controlled by control means compelling said elevators to take a deflection position dependent on an electrical signal $\delta_{mc}$ representative of the controlled value of the angle of deflection $\delta_m$ of said elevators, is noteworthy in that it comprises:

first means of calculation for calculating, on the basis of an electrical signal nzc representative of a controlled value of said load factor, a first electrical signal $\dot{\gamma}_c$ representative of the controlled value of the derivative, with respect to time, of the aerodynamic slope $\gamma$ of said aircraft;

a first constituent device, which:
  is able to receive at its input said first electrical signal $\dot{\gamma}_c$;
  comprises first means of protection able to maintain said first electrical signal $\dot{\gamma}_c$ between a minimum value and a maximum value;
  on the basis of said first electrical signal $\dot{\gamma}_c$ determines at least a second electrical signal $\alpha_c$, representative of the corresponding controlled value of the incidence $\alpha$, and a third electrical signal $\theta_c$, representative of the corresponding controlled value of the longitudinal attitude $\theta$;
  comprises second means of protection able to maintain said second electrical signal $\alpha_c$ between a minimum value and a maximum value; and
  delivers at least said third electrical signal $\theta_c$ to its output; and a second constituent device, which
  is able to receive at its input at least said third electrical signal $\theta_c$ or a fourth electrical signal $\theta_d$ similar to said third electrical signal $\theta_c$;
  comprises third means of protection able to maintain said third or fourth electrical signal between a minimum value and a maximum value; and
  is able to deliver at its output a fifth electrical signal which constitutes said signal $\delta_{mc}$, representative of the corresponding controlled value of the angle of deflection $\delta_m$ of said elevators.

Advantageously, the system in accordance with the invention comprises first means of switching that can take:

either a first position for which the output of said first constituent device is connected to the input of said second constituent device, so that said third electrical signal $\theta_c$ is then transmitted to said second constituent device;

or a second position for which the input of said second device receives said fourth electrical signal $\theta_d$, similar to said third electrical signal $\theta_c$ and produced on the basis of a sixth electrical signal $q_d$, representative of a desired value for the rate of pitch q.

It is noted that, in a known manner, the load factor nz is equal to $V.\dot{\gamma}/g$ in which expression V is the speed of the aircraft, g the acceleration due to gravity and $\dot{\gamma}$ the derivative of the aerodynamic slope. It is thus easy to transform the controlled load factor signal $nz_c$ into said first electrical signal $\dot{\gamma}_c$, since then $\dot{\gamma}_c$ is equal to $nz_c.g/V$.

Preferably, said first constituent device determines, in addition to said second electrical signal $\alpha_c$ and said third electrical signal $\theta_c$, a seventh electrical signal $q_c$, representative of the corresponding controlled value of the rate of pitch q, and said first means of switching are able to transmit said seventh electrical signal $q_c$ to said second constituent device.

By simplification, said first constituent device delivers, for the seventh electrical signal $q_c$, an approximate value equal to that of said first electrical signal $\dot{\gamma}_c$.

In an advantageous embodiment of the electric flight control system in accordance with the present invention, said system comprises:

an automatic pilot able to deliver a controlled load factor signal $nz_c$;

a manual piloting member able to deliver, by switching, either a controlled load factor signal $nz_c$, or said sixth electrical signal $q_d$, representative of a desired value for the rate of pitch q; and second means of switching for:
transmitting to said first constituent device either the controlled load factor signal delivered by said automatic pilot, or the controlled load factor signal delivered by said manual piloting member;

or else transmitting said sixth electrical signal $q_d$ to first means of integration able to form the fourth electrical signal $\theta_d$, representative of a desired value for the attitude $\theta$, said first means of switching being able to transmit to said second constituent device said fourth and sixth electrical signals $\theta_d$ and $q_d$, instead of said third and seventh electrical signals $\theta_c$ and $q_c$ produced by said first constituent device.

Preferably, to determine said second electrical signal $\alpha_c$ on the basis of the first signal $\dot{\gamma}_c$, said first constituent device comprises second means of calculation calculating the expression $$\alpha_c=(\dot{\gamma}_c-F_\gamma)/G_\gamma$$

in which $F_\gamma$ and $G_\gamma$ are functions of the state of the aircraft with $$F_\gamma = \frac{g \cdot \cos(\gamma)}{V} + \frac{1}{2}\frac{\rho}{m} \cdot V \cdot S \cdot Cz_{a=0}$$

and $$G_\gamma = \frac{1}{2} \cdot \frac{\rho}{m} \cdot V \cdot S \cdot \left.\frac{\partial Cz}{\partial \alpha}\right|_{\alpha=0} + \frac{T}{m \cdot V}$$

where g is the acceleration due to gravity, $\gamma$ the aerodynamic slope, V the speed of the aircraft, $\rho$ the density of the air, m the mass of the aircraft, S the reference area of the aircraft, $Cz_{\alpha=0}$ the coefficient of lift of the aircraft for a zero incidence, $$\left.\frac{\partial Cz}{\partial \alpha}\right|_{\alpha=0}$$

the gradient of the aerodynamic coefficient of lift as a function of the incidence and T the thrust of the aircraft.

To form said third electrical signal $\theta_c$, said first constituent device may comprise second integrator means able to integrate said seventh electrical signal $q_c$ and a first summator for forming the sum of the integral delivered by said second integrator means and of said second electrical signal $\alpha_c$.

Advantageously, said second constituent device, either on the basis of said third electrical signal $\theta_c$ and of the seventh electrical signal $q_c$ originating from said first constituent device, or on the basis of said fourth signal $\theta_d$ and of said seventh signal $q_d$ originating from said manual piloting member, as well as current values $q_r$ and $\theta_r$ of the rate of pitch q and of the longitudinal attitude $\theta$, determines an eighth electrical signal $\dot{q}_c$, representative of the corresponding controlled value of the pitch acceleration $\dot{q}$, then, on the basis of the eighth electrical signal $\dot{q}_c$, said second constituent device determines said fifth electrical signal $\delta_{mc}$.

Preferably, said second constituent device calculates said eighth electrical signal $\dot{q}_c$ through the relation $$\dot{q}_c = K1.\theta_v - K2.\theta_r + K3.q_v - K4.q_r$$

where $\theta_v$ is said third or fourth electrical signal, $\theta_r$ the current value of the longitudinal attitude $\theta$, $q_v$ said sixth or seventh electrical signal, $q_r$ the current value of the rate of pitch q, K1, K2, K3 and K4 being constant coefficients. Moreover, to determine said fifth electrical signal $\delta_{mc}$ on the basis of said eighth electrical signal $\dot{q}_c$, said second constituent device advantageously comprises third means of calculation calculating the expression $$\delta_{mc}=(\dot{q}_c-F_q)/G_q$$

in which $F_q$ and $G_q$ are functions of the state of the aircraft with $$F_q = \frac{1}{I_y} \cdot \frac{1}{2} \cdot \rho \cdot v^2 \cdot S \cdot l \cdot Cm_{\delta m=0} + \frac{1}{I_y} \cdot T \cdot b \cdot \cos(\tau)$$

and $$G_q = \frac{1}{I_y} \cdot \frac{1}{2} \cdot \rho \cdot v^2 \cdot S \cdot l \cdot \left.\frac{\partial Cm}{\partial \delta m}\right|_{\delta m=0}$$

where $I_y$ is the pitch inertia, $\rho$ the density of the air, V the speed of the aircraft, S the reference area of the aircraft, l the reference length of the aircraft, $Cm_{\delta m=0}$ the coefficient of pitch, T the thrust, b the lever arm of the engines, $\tau$ the angle of longitudinal trim of the engines and $$\left.\frac{\partial Cm}{\partial \delta m}\right|_{\delta m=0}$$

the effectiveness of the elevators.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
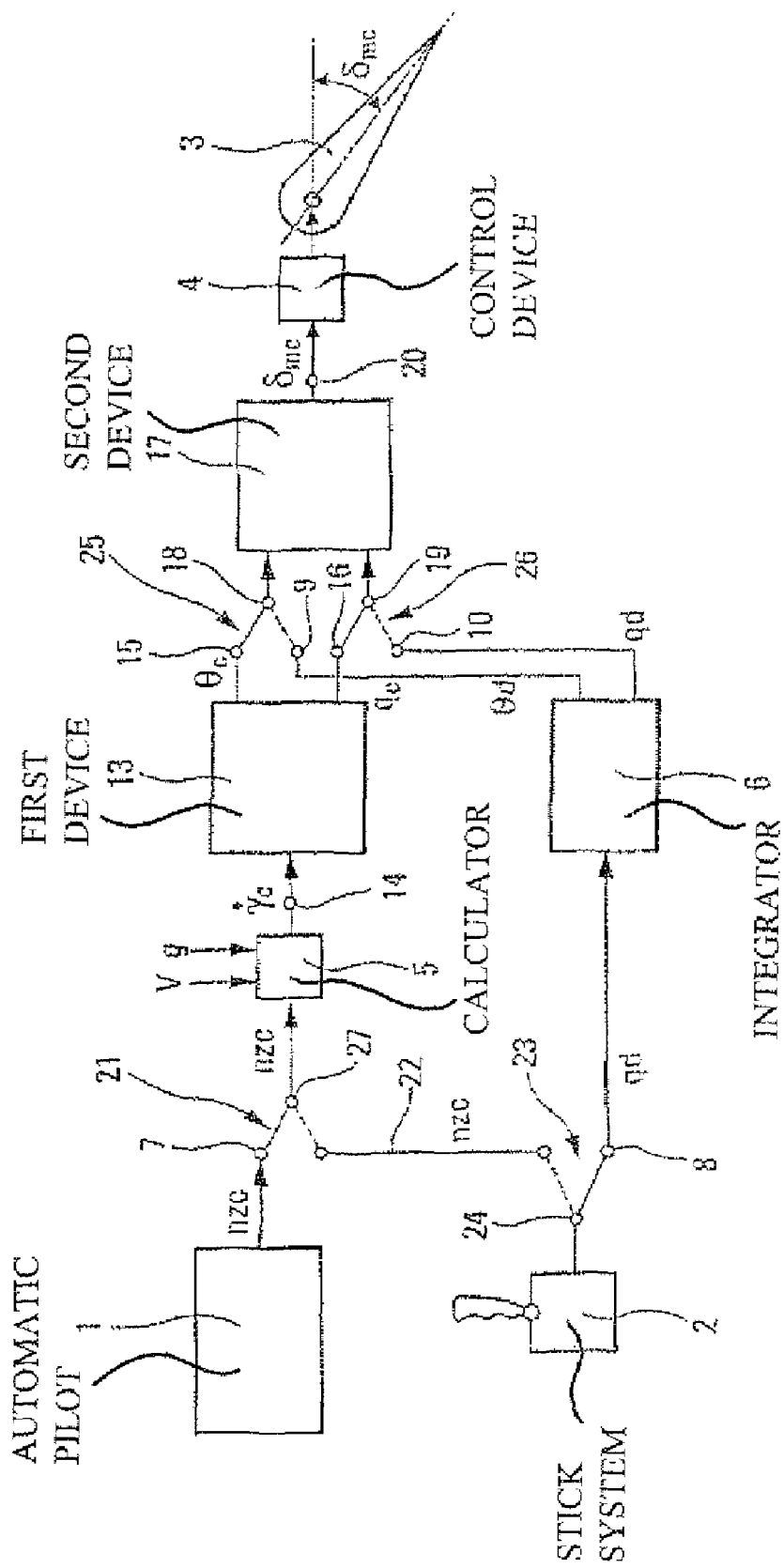
FIG. 1 is the schematic diagram of an exemplary embodiment of the electric flight control system in accordance with the present invention.

In the diagrammatic exemplary embodiment of the electric flight control system for aircraft, in accordance with the present invention and shown in FIG. 1, there is represented an automatic pilot 1, a stick system 2, directional control surfaces 3 and a device 4 for controlling the deflection of said control surfaces.

In this example, it is assumed that the automatic pilot 1 was able to emit, on its output terminal 7, an electrical control signal $nz_c$ corresponding to a controlled value of the load factor, while the stick system 2 was able to produce, on its output terminal 24, an electrical control signal corresponding, by switching, either to a desired value $q_d$ of the rate of pitch, or to a controlled value $nz_c$ of the load factor. Moreover, there is provided, on the one hand, means of calculation 5 able to calculate, on the basis of the controlled value $nz_c$, an electrical signal $\dot{\gamma}_c$, representative of a controlled value of the derivative, with respect to time, of the aerodynamic slope $\gamma$ and, on the other hand, means of integration 6, able to produce, on the basis of said desired value $q_d$, an electrical signal $\theta_d$, representative of a desired value of the longitudinal attitude $\theta$.

The means of calculation 5 exploit the relation $$nz = V \cdot \dot{\gamma}/g$$

linking the load factor nz and the derivative $\dot{\gamma}$ of the aerodynamic slope $\gamma$, V being the speed of the aircraft and g the acceleration due to gravity. Thus, the means of calculation 5, to which the speed V and the acceleration due to gravity g are addressed and which receive the controlled value $nz_c$, determine the quantity $\dot{\gamma}_c$ through the expression $$\dot{\gamma}_c = nz_c \cdot g/V.$$

Figure 2:
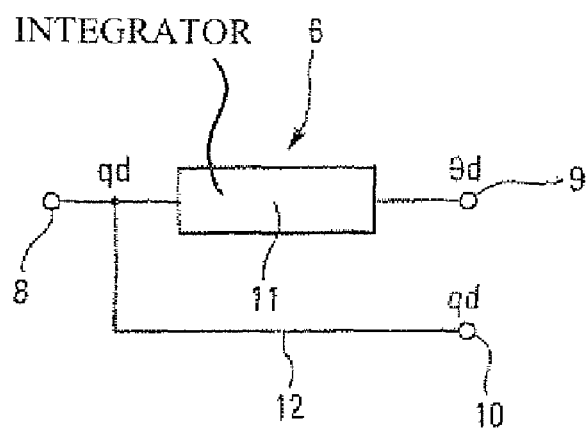
FIG. 2 shows the diagram of an integration device used in the system of FIG. 1.

The integration means 6, for their part, comprise an input terminal 8 and two output terminals 9 and 10. Between the terminals 8 and 9 is disposed an integrator 11, while a link 12 connects the terminals 8 and 10 (see FIG. 2). Thus, when the desired value $q_d$ of the rate of pitch is applied to the input terminal 8, there are obtained, by integration by the integrator 11, the desired value of longitudinal attitude $\theta_d$ on the output terminal 9 and the desired value of rate of pitch $q_d$ on the terminal 10.

This being previously described, it is seen in FIG. 1 that the exemplary electric flight control system according to the invention, which is represented therein, comprises:
- a first constituent device 13, comprising an input terminal 14, upstream of which are disposed the means of calculation 5, and two output terminals 15 and 16;
- a second constituent device 17, comprising two input terminals 18 and 19 and an output terminal 20, the latter output terminal controlling the device 4;
- a switch 21, able to connect the input terminal 27 of the means of calculation 5, either to the output terminal 7 of the automatic pilot 1, or to a terminal 22;
- a switch, 23 able to connect the output terminal 24 of the stick system 2, either to said terminal 22, or to the input terminal 8 of the integration means 6, said switch 23 controlling moreover the switching between the pitch rate signal $q_d$ and the signal $nz_c$ at said output terminal 24; when the switch 23 connects the terminals 24 and 8, the output signal of the stick system 2 is the signal $q_d$; conversely, when the switch 23 connects the terminals 24 and 22, the output signal of the stick system 2 is the signal $nz_c$;
- a switch 25, able to connect the input terminal 18 of the second device 17, either to the output terminal 15 of the first device 13, or to the output terminal 9 of the integration means 6; and
- a switch 26, able to connect the input terminal 19 of the second device 17, either to the output terminal 16 of the first device 13, or to the output terminal 10 of the integration means 6.

From the foregoing, it may therefore been seen that:
when the switches 21, 25 and 26 connect respectively the terminals 27 and 7, 18 and 15 and 19 and 16, the elevators 3 are controlled on the basis of the automatic pilot 1, by way of the first and second devices 13 and 17, the control parameter being the controlled value $nz_c$ of the load factor;
when the switches 21, 23, 25 and 26 connect respectively the terminals 27 and 22, 22 and 24, 18 and 15 and 19 and 16, the elevators 3 are controlled on the basis of the stick system 2, by way of the first and second devices 13 and 17, the control parameter being the controlled value $nz_c$ of said load factor; and
when the switches 23, 25 and 26 connect respectively the terminals 24 and 8, 18 and 9 and 19 and 10, the elevators 3 are controlled on the basis of the stick system 2, by way of the second device 17 alone, the control parameter being the desired rate of pitch $q_d$.

Figure 4:
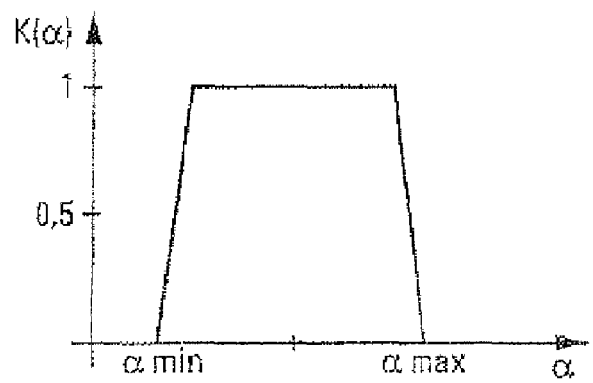
FIG. 4 illustrates the gain curve of a device of FIG. 3.
Figure 3:
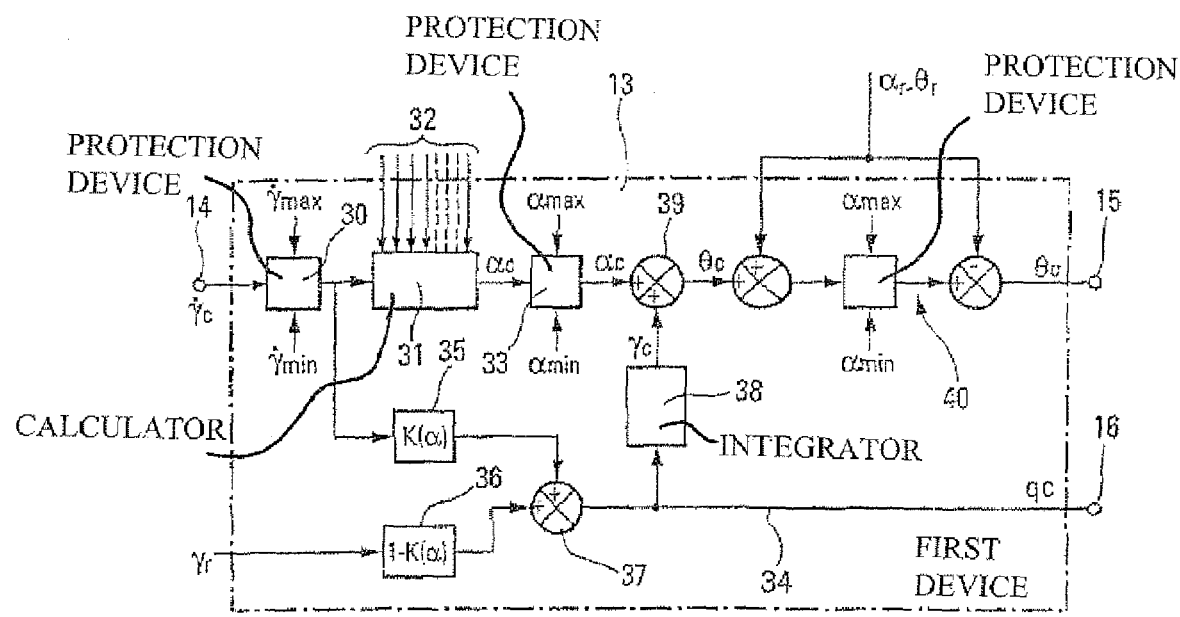
FIG. 3 is the schematic diagram of the first constituent device of the system of FIG. 1.
Figure 5:
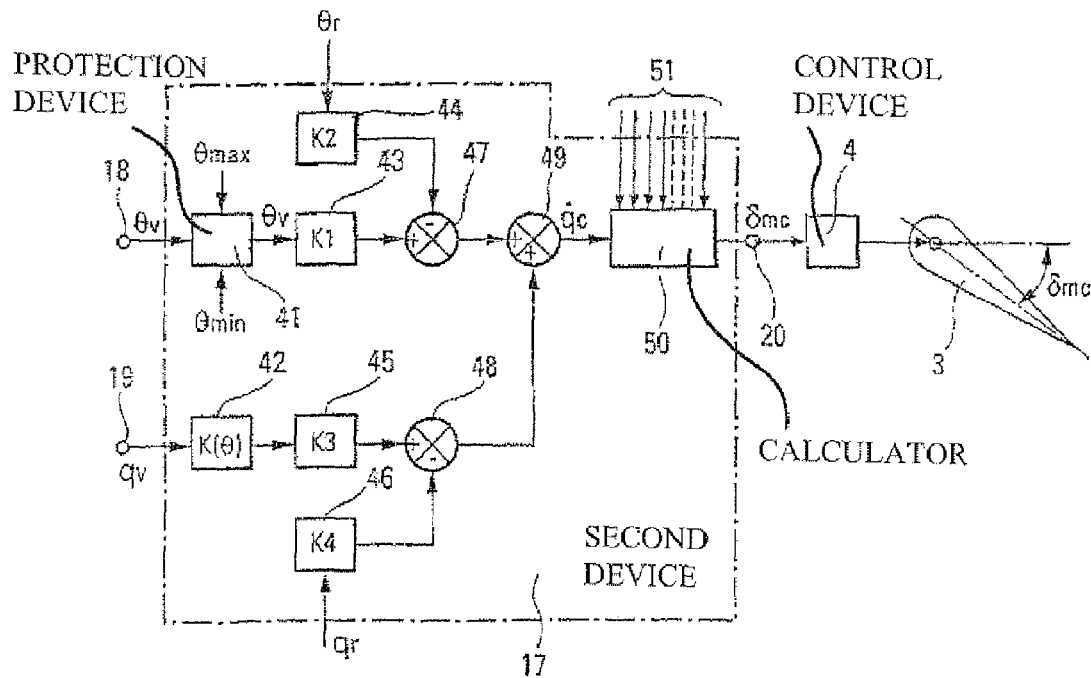
FIG. 5 is the schematic diagram of the second constituent device of the system of FIG. 1.

Represented in FIG. 3 is an exemplary embodiment for the first constituent device 13. In this exemplary embodiment, the first device 13 comprises:
- a protection device 30, for example of the voter type, receiving the signal $\dot{\gamma}_c$ of the means of calculation 5 on the terminal 14 able to protect this signal between a maximum value $\dot{\gamma}_{max}$ and a minimum value $\dot{\gamma}_{min}$;
- a calculator 31 receiving the signal $\dot{\gamma}_c$ of the protection device 30, as well as a plurality of cues 32 and calculating (in the manner described hereinafter) a controlled incidence signal $\alpha_c$;
- a protection device 33, for example of the voter type, receiving the controlled incidence signal $\alpha_c$ and able to protect this signal between a maximum value $\alpha_{max}$ and a minimum value $\alpha_{min}$;
- a link 34 between the output of the protection device 30 and the output terminal 16, said link 34 comprising a device 35 of gain $K(\alpha)$ varying as a function of the incidence $\alpha$; it is noted that at the output of the protection device 30 there appears the signal $\dot{\gamma}_c$, which is equal to the difference between the controlled rate of pitch $q_c$ and the derivative of the controlled incidence $\dot{\alpha}_c$ (in fact, $\theta = \alpha + \gamma$). Now, the derivative of the controlled incidence $\dot{\alpha}_c$ is generally very noisy, so that it is preferable to neglect it; hence the derivative of the controlled slope $\dot{\gamma}_c$ is used to estimate an approximate value of the controlled rate of pitch $q_c$. As shown in FIG. 4, the gain $K(\alpha)$ is always equal to 1, except in the neighborhood of $\alpha_{min}$ and of $\alpha_{max}$, where it decreases to zero. Protection in terms of incidence is thus obtained;
- a device 36 of gain $1 - K(\alpha)$, receiving the current aerodynamic slope cue $\gamma_r$;
- a summator 37 adding together the output signals of the devices 35 and 36 and addressing the resultant signal thereof to the terminal 16; this resultant signal is therefore $\dot{\gamma}_c$, when $\alpha$ is far from $\alpha_{min}$ and from $\alpha_{max}$ and $\gamma_r$ when $\alpha$ is equal to $\alpha_{min}$ or to $\alpha_{max}$;
- an integrator 38, integrating the signal in the link 34 and therefore forming a controlled slope $\gamma_c$;
- a summator 39, adding together said controlled slope $\gamma_c$ given by the integrator 38 and the controlled incidence $\alpha_c$, originating from the protection device 33 to obtain the controlled attitude $\theta_c$ and address it to the terminal 15, possibly by way of a supplementary incidence-based protection device 40, involving the current values $\alpha_r$ and $\theta_r$ of the incidence and of the attitude.

The manner of operation of the calculator 31 is based on the equation for the lift which may be written $$\dot{\gamma} = F_\gamma + G_\gamma \cdot \alpha$$

in which expression $F_\gamma$ and $G_\gamma$ are functions of the state of the aircraft with $$F_\gamma = \frac{g \cdot \cos(\gamma)}{V} + \frac{1}{2}\frac{\rho}{m} \cdot V \cdot S \cdot Cz_{\alpha=0}$$

-continued and $$G_\gamma = \frac{1}{2} \cdot \frac{\rho}{m} \cdot V \cdot S \cdot \left.\frac{\partial Cz}{\partial \alpha}\right|_{\alpha=0} + \frac{T}{m \cdot V}$$

where g is the acceleration due to gravity, $\gamma$ the aerodynamic slope, V the speed of the aircraft, $\rho$ the density of the air, m the mass of the aircraft, S the reference area of the aircraft, $Cz_{\alpha=0}$ the coefficient of lift of the aircraft for a zero incidence, $$\left.\frac{\partial Cz}{\partial \alpha}\right|_{\alpha=0}$$

the gradient of the aerodynamic coefficient of lift as a function of the incidence and T the thrust of the aircraft.

The cues 32 received by the calculator 31 therefore consist of the parameters g, $\gamma$, V, $\rho$, m, S, $Cz_{\alpha=0}$, $$\left.\frac{\partial Cz}{\partial \alpha}\right|_{\alpha=0}$$

and T, available on board the aircraft and making it possible to calculate $F_\gamma$ and $G_\gamma$, after which the calculator 31 calculates $\alpha_c$ by the expression $$\alpha_c = (\dot{\gamma}_c - F_\gamma)/G_\gamma.$$

Thus, on the terminals 15 and 16 of the first constituent device 13 there appear respectively the controlled attitude $\theta_c$ and the controlled rate of pitch $q_c$.

As was mentioned above, the controlled attitude signal $\theta_v$ appearing on the input terminal 18 of the second constituent device 17 is formed either by the signal $\theta_c$, originating from the output terminal 15 of the first constituent device 13, or by the signal $\theta_d$, originating from the means of integration 6.

Likewise, the controlled rate of pitch signal q, appearing on the input terminal 19 of said second constituent device 17 is formed either by the signal $q_c$, originating from the output terminal 16 of the first constituent device 13, or by the signal $q_d$ originating from the means of integration 6.

In the second constituent device 17, the controlled longitudinal attitude signal $\theta_v$ is addressed to a protection device 41, for example of the voter type, able to maintain this signal between a minimum value $\theta_{min}$ and a maximum value $\theta_{max}$. The controlled rate of pitch signal $q_v$, for its part, is addressed to a gain device 42, whose gain $K(\theta)$ is always equal to 1, except when $\theta$ is in the neighborhood of $\theta_{min}$ or of $\theta_{max}$, for which values $K(\theta)$ is equal to zero (the curve of the gain $K(\theta)$ as a function of $\theta$ is similar to that shown in FIG. 4 in regard to the variation of $K(\alpha)$ as a function of $\alpha$).

On the basis of the values $\theta_v$ (thus protected) and $q_v$ (passed into the device 42), the constituent device 17 comprises means for calculating the derivative with respect to time of $q_v$ representative of the controlled value $\dot{q}_c$ of the pitch acceleration. These means of calculation comprise:

a gain device 43, of gain K1, receiving the signal $\theta_v$ of the protection device 41;

a gain device 44, of gain K2, receiving the current value $\theta_r$ of the longitudinal attitude;

a gain device 45, of gain K3, receiving the signal $q_v$ of the device 42;

a gain device 46, of gain K4, receiving the current value $q_r$ of the rate of pitch q;

a subtractor 47 for calculating the difference $K1.\theta_v - K2.\theta_r$;

a subtractor 48 for calculating the difference $K3.q_v - K4.q_r$; and an adder 49 for computing the sum $$\dot{q}_c = K1.\theta_v - K2.\theta_r + K3.q_v - K4.q_r.$$

In it noted that, by Laplace transformation, this sum may be written $$s^2.\theta_r = K1.\theta_v - K2.\theta_r + K3.s\theta_v - K4.s.\theta_r.$$

in which expression s is the Laplace operator, so that $$\theta_r/\theta_v = (\tau.s+1).\omega^2/(s^2 + 2.z.\omega.s + \omega^2)$$

taking $K1 = K2 = \omega^2$, $K3 = \tau/\omega^2$ and $K4 - 2.z.\omega$.

The elements 43 to 49 therefore behave like a second order filter, of natural angular frequency $\omega$ and damping z, with a first order phase advance with time constant equal to $\tau$.

Figure 6:
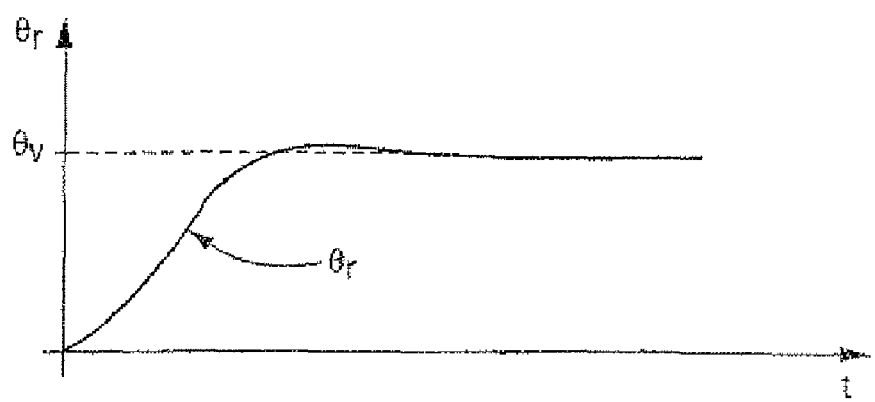
FIGS. 6 and 7 are diagrams illustrating the nature of the means of calculation of the second constituent device calculating the eighth electrical signal $\dot{q}_c$.
Figure 7:
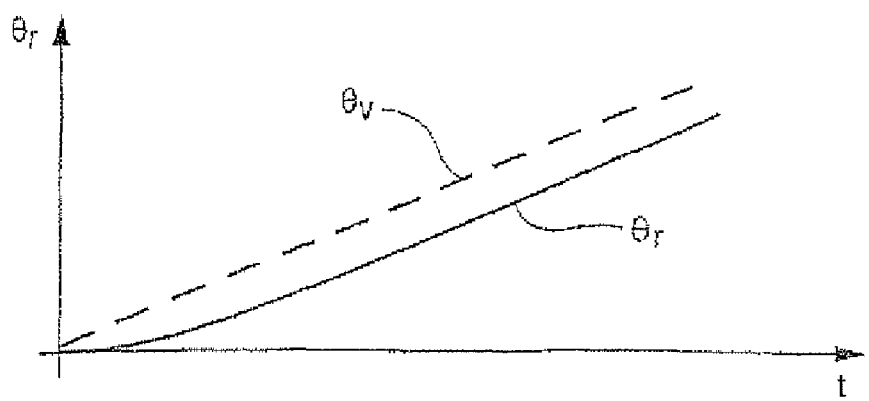

Represented respectively in FIGS. 6 and 7 are the indicial response and the pursuit response of such a filter, as a function of time t.

The second constituent device 17 comprises moreover a calculator 50 receiving the controlled value $\dot{q}_c$ of the pitch acceleration, formulated by the elements 43 to 49, as well as a plurality of cues 51, and calculating the signal $\delta_{mc}$.

The manner of operation of the calculator 50 is based on the fact that, in a known fashion, the acceleration of the pitch $\dot{q}$ of an aircraft is an affine function of the angle of deflection $\delta_m$ of the elevators 3, which may be written $$\dot{q} = F_q + G_q.\delta_m$$

in which expression $$F_q = \frac{1}{I_y} \cdot \frac{1}{2} \cdot \rho \cdot v^2 \cdot S \cdot l \cdot Cm_{\delta m=0} + \frac{1}{I_y} \cdot T \cdot b \cdot \cos(\tau)$$

and $$G_q = \frac{1}{I_y} \cdot \frac{1}{2} \cdot \rho \cdot v^2 \cdot S \cdot l \cdot \left.\frac{\partial Cm}{\partial \delta m}\right|_{\delta m=0}$$

where $I_y$ is the pitch inertia, $\rho$ the density of the air, V the speed of the aircraft, S the reference area of the aircraft, l the reference length of the aircraft, $Cm_{\delta m=0}$ the coefficient of pitch, T the thrust, b the lever arm of the engines, $\tau$ the angle of longitudinal trim of the engines and $$\left.\frac{\partial Cm}{\partial \delta m}\right|_{\delta m=0}$$

the effectiveness of the elevators.

Thus, the cues 51 comprise $I_y$, $\rho$, V, S, l, $Cm_{\delta m=0}$, T, b, $\tau$ and $$\left.\frac{\partial Cm}{\partial \delta m}\right|_{\delta m=0}$$

and the calculator 50 calculates the expression $$\delta_{mc} = (\dot{q}_c - F_q)/G_q.$$

It is thus seen that, by virtue of the present invention, one obtains a system of longitudinal electric flight controls with integrated protections in terms of load factor, incidence and longitudinal attitude, the piloting parameter being able to be, by choice, the load factor or the rate of pitch.

The invention claimed is:

1. An electric flight control system for the control in terms of load factor of the elevators of an aircraft, said elevators being controlled by a control section that compels said elevators to take a deflection position dependent on an electrical signal $\delta_{mc}$ representative of a controlled value of the angle of deflection $\delta_m$ of said elevators, said system comprising:

a first calculation section for calculating, on the basis of an electrical signal nzc representative of a controlled value of said load factor, a first electrical signal $\dot{\gamma}_c$ representative of a controlled value of the derivative, with respect to time, of the aerodynamic slope $\gamma$ of said aircraft;

a first constituent device, which:
is configured to receive at its input said first electrical signal $\dot{\gamma}_c$;
comprises a first protection section configured to maintain said first electrical signal $\dot{\gamma}_c$ between a first minimum value and a first maximum value;
on the basis of said first electrical signal $\dot{\gamma}_c$, determines at least a second electrical signal $\alpha_c$, representative of a corresponding controlled value of the incidence $\alpha$, and a third electrical signal $\theta_c$, representative of a corresponding controlled value of the longitudinal attitude $\theta$;
comprises a second protection section configured to maintain said second electrical signal $\alpha_c$ between a second minimum value and a second maximum value; and
delivers at least said third electrical signal $\theta_c$ to its output; and a second constituent device, which is configured to receive at its input at least said third electrical signal $\theta_c$ or a fourth electrical signal $\theta_d$ similar to said third electrical signal $\theta_c$;
comprises a third protection section configured to maintain said third or fourth electrical signal between a third minimum value and a third maximum value; and
is configured to deliver at its output a fifth electrical signal which constitutes said signal $\delta_{mc}$, representative of the corresponding controlled value of the angle of deflection $\delta_m$ of said elevators.

2. The system as claimed in claim 1, further comprising a first switching section configured to take:
either a first position for which the output of said first constituent device is connected to the input of said second constituent device, so that said third electrical signal $\theta_c$ is then transmitted to said second constituent device;
or a second position for which the input of said second device receives said fourth electrical signal $\theta_d$, similar to said third electrical signal $\theta_c$ and produced on the basis of a sixth electrical signal $q_d$, representative of a desired value for a rate of pitch q.

3. The system as claimed in claim 1, wherein said first constituent device determines, in addition to said second electrical signal $\alpha_c$ and said third electrical signal $\theta_c$, a seventh electrical signal $q_c$, representative of a corresponding controlled value of the rate of pitch q, and a first switching section configured to transmit said seventh electrical signal $q_c$ to said second constituent device.

4. The system as claimed in claim 3, wherein said first constituent device delivers, for the seventh electrical signal $q_c$, an approximate value equal to that of said first electrical signal $\dot{\gamma}_c$.

5. The system as claimed in claim 2, further comprising:
an automatic pilot configured to deliver a first controlled load factor signal $nz_c$;
a manual piloting member configured to deliver, by switching, either a second controlled load factor signal $nz_c$ or said sixth electrical signal $q_d$, representative of a desired value for the rate of pitch q; and
a second switching section for:
transmitting to said first constituent device either the first controlled load factor signal delivered by said automatic pilot, or the second controlled load factor signal delivered by said manual piloting member;
or else transmitting said sixth electrical signal $q_d$ to a first integration section configured to form the fourth electrical signal $\theta_d$, representative of a desired value for an attitude $\theta$,
said first switching section being configured to transmit to said second constituent device said fourth and sixth electrical signals $\theta_d$ and $q_d$, instead of said third and seventh electrical signals $\theta_c$ and $q_c$ produced by said first constituent device.

6. The system as claimed in claim 1, wherein, to determine said second electrical signal $\alpha_c$ on the basis of the first signal $\dot{\gamma}_c$, said first constituent device comprises a second calculation section for calculating the expression $$\alpha_c = (\dot{\gamma}_c - F_{\gamma5})/G_\gamma$$

in which $F_\gamma$ and $G_\gamma$ are functions of the state of the aircraft with $$F_\gamma = \frac{g \cdot \cos(\gamma)}{V} + \frac{1}{2}\frac{\rho}{m} \cdot V \cdot S \cdot Cz_{\alpha=0}$$

and $$G_\gamma = \frac{1}{2} \cdot \frac{\rho}{m} \cdot V \cdot S \cdot \left.\frac{\partial Cz}{\partial \alpha}\right|_{\alpha=0} + \frac{T}{m \cdot V}$$

where g is the acceleration due to gravity, $\gamma$ the aerodynamic slope, V the speed of the aircraft, $\rho$ the density of the air, m the mass of the aircraft, S the reference area of the aircraft, $Cz_{\alpha=0}$ the coefficient of lift of the aircraft for a zero incidence, $$\left.\frac{\partial Cz}{\partial \alpha}\right|_{\alpha=0}$$

the gradient of the aerodynamic coefficient of lift as a function of the incidence and T the thrust of the aircraft.

7. The system as claimed in claim 3, wherein said first constituent device comprises a second integrator section configured to integrate said seventh electrical signal qc and a first summator for forming the sum of the integral delivered by said second integrator section and of said second electrical signal $\alpha_c$, so as to form said third electrical signal $\theta$c.

8. The system as claimed in claim 5, wherein said second constituent device, either on the basis of said third electrical signal $\theta_c$ and of the seventh electrical signal $q_c$, originating from said first constituent device, or on the basis of said fourth signal $\theta_d$ and of said sixth signal $q_d$ originating from said manual piloting member, well as current values $q_r$ and $\theta_r$ of the rate of pitch q and of the longitudinal attitude $\theta$, determines an eighth electrical signal $\dot{q}_c$, representative of a corresponding controlled value of the pitch acceleration $\dot{q}$, then, on the basis of this eight electrical signal $\dot{q}_c$ said second constituent device determines said fifth electrical signal $\delta_{mc}$.

9. The system as claimed in claim 8, wherein said second constituent device calculates said eight electrical signal $\dot{q}_c$, through the relation $$\dot{q}_c = K1.\theta_v - K2.\theta_r + K3.q_v - K4.q_r$$

where $\theta_v$ said third or fourth electrical signal, $\theta_r$ the current value of the longitudinal attitude $\theta$, $q_v$ said sixth or seventh electrical signal, $q_r$ the current value of the rate of pitch q, K1, K2, K3 and K4 being constant coefficients.

10. The system as claimed in claim 8, wherein, to determine said fifth electrical signal $\delta_{mc}$ on the basis of said eighth electrical signal $\dot{q}_c$, said second constituent device comprises a third calculation section that calculates the expression $$\delta_{mc} = (\dot{q}_c - F_q)/G_q$$

in which $F_q$ and $G_q$ are functions of the state of the aircraft with $$F_q = \frac{1}{I_y} \cdot \frac{1}{2} \cdot \rho \cdot v^2 \cdot S \cdot l \cdot Cm_{\delta m=0} + \frac{1}{I_y} \cdot T \cdot b \cdot \cos(\tau)$$

and $$G_q = \frac{1}{I_y} \cdot \frac{1}{2} \cdot \rho \cdot v^2 \cdot S \cdot l \cdot \frac{\partial Cm}{\partial \delta m}\bigg|_{\delta m=0}$$

where $I_y$ is the pitch inertia, $\rho$ the density of the air, V the speed of the aircraft, S the reference area of the aircraft, l the reference length of the aircraft, $Cm_{\delta m=0}$ the coefficient of pitch, T the thrust, b the lever arm of the engines, $\tau$ the angle of longitudinal trim of the engines and $$\frac{\partial Cm}{\partial \delta m}\bigg|_{\delta m=0}$$

the effectiveness of the elevators.

\* \* \* \* \*